US012625949B2

(12) United States Patent
Sharpe

(10) Patent No.: US 12,625,949 B2
(45) Date of Patent: May 12, 2026

(54) SYSTEMS AND METHODS FOR GENERATING EXPLAINABILITY FOR USER CLASSIFICATIONS USING MOTIF EMBEDDINGS

(71) Applicant: Capital One Services, LLC, McLean, VA (US)

(72) Inventor: Samuel Sharpe, Cambridge, MA (US)

(73) Assignee: Capital One Services, LLC, McLean, VA (US)

( * ) Notice: Subject to any disclaimer, the term of this patent is extended or adjusted under 35 U.S.C. 154(b) by 68 days.

(21) Appl. No.: 18/828,980

(22) Filed: Sep. 9, 2024

(65) Prior Publication Data

US 2026/0073041 A1     Mar. 12, 2026

(51) Int. Cl.
*G06F 21/55*          (2013.01)
*G06F 21/57*          (2013.01)
*G06F 21/60*          (2013.01)

(52) U.S. Cl.
CPC .......... *G06F 21/552* (2013.01); *G06F 21/577* (2013.01); *G06F 21/606* (2013.01)

(58) Field of Classification Search
CPC ..... G06F 21/552; G06F 21/606; G06F 21/577
See application file for complete search history.

(56) References Cited

U.S. PATENT DOCUMENTS

| | | | | |
|---|---|---|---|---|
| 12,423,445 B1 * | 9/2025 | Gupta | .................... | G06F 21/606 |
| 2012/0331487 A1 * | 12/2012 | Mikami | .............. | G06F 16/9027 |
| | | | | 719/318 |
| 2020/0410283 A1 * | 12/2020 | Ramachandra | ........ | G06V 10/82 |
| 2021/0264025 A1 * | 8/2021 | Givental | .............. | G06N 3/0464 |
| 2021/0406614 A1 * | 12/2021 | Arroyo | .................. | G06F 18/254 |
| 2022/0207117 A1 * | 6/2022 | Hu | ........................... | G06F 21/54 |
| 2024/0054233 A1 * | 2/2024 | Ohayon | .................. | G06F 21/54 |

* cited by examiner

*Primary Examiner* — Harunur Rashid
(74) *Attorney, Agent, or Firm* — Foley & Lardner LLP

(57)          ABSTRACT

Systems and methods for generating explainability for user classifications using motif embeddings. In some aspects, the system generates a first set of embeddings in an embedding space by inputting, to a motif encoder model, a set of event motifs associated with a set of labels. The system generates a second set of embeddings for a first user by providing, to the motif encoder model, an event sequence of the first user. The system selects a set of search anchor embeddings by determining a first set of distances between the second set of embeddings and the first set of embeddings. The system queries the embedding space to select a candidate profile for association with the first user and concurrently presents the explanatory label and a profile title associated with the candidate profile.

18 Claims, 4 Drawing Sheets

400

400

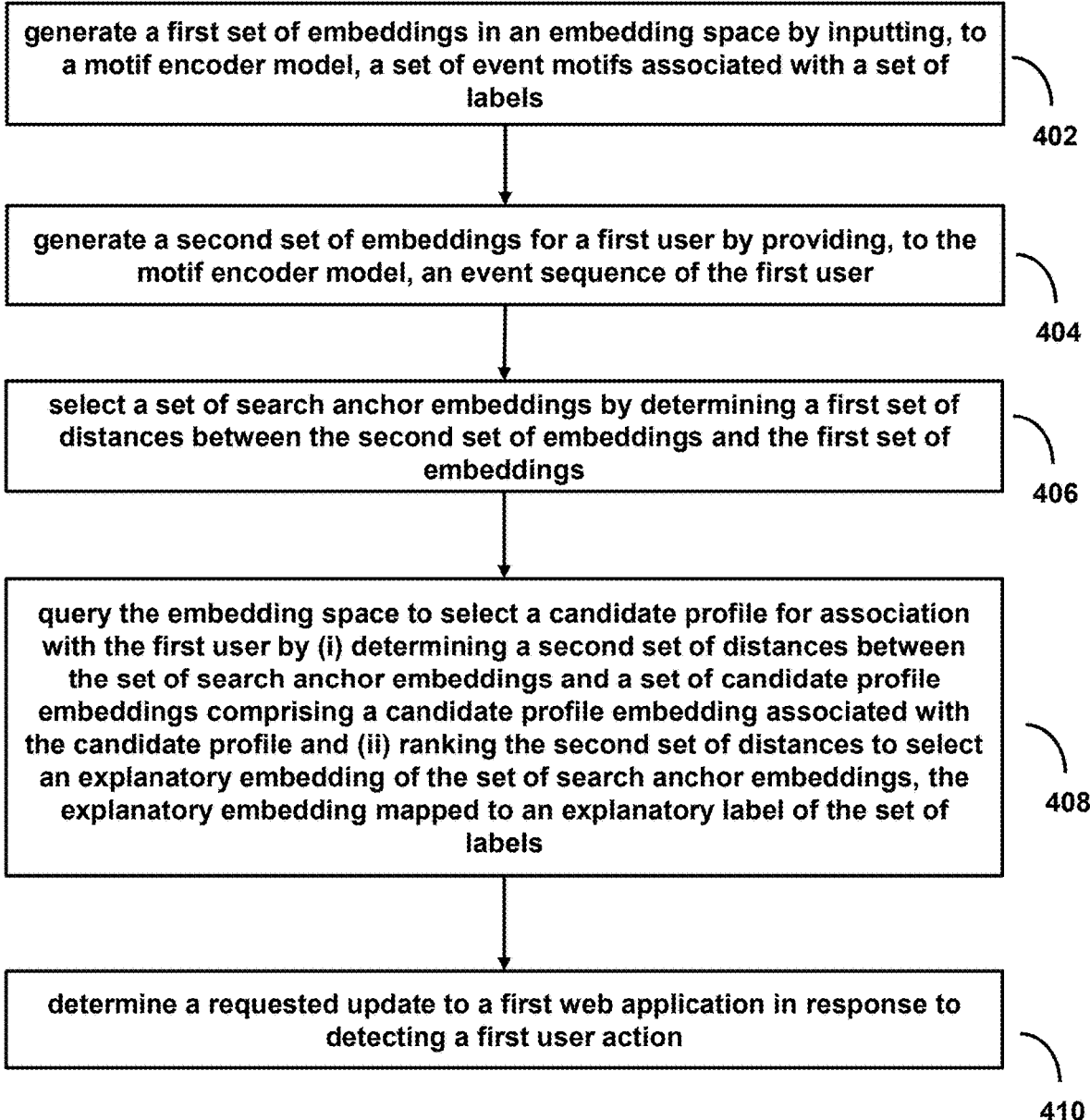

generate a first set of embeddings in an embedding space by inputting, to a motif encoder model, a set of event motifs associated with a set of labels

402 generate a second set of embeddings for a first user by providing, to the motif encoder model, an event sequence of the first user

404 select a set of search anchor embeddings by determining a first set of distances between the second set of embeddings and the first set of embeddings

406 query the embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of labels

408 determine a requested update to a first web application in response to detecting a first user action

SYSTEMS AND METHODS FOR GENERATING EXPLAINABILITY FOR USER CLASSIFICATIONS USING MOTIF EMBEDDINGS

SUMMARY

Methods and systems are described herein for novel uses and/or improvements to artificial intelligence applications. As one example, methods and systems are described herein for generating explainability for user classifications based on an embedding space. For example, the system may use action-sequence motif embeddings as anchors to classify users.

Conventional systems for classifying users into labels are often opaque with respect to the process of matching users to labels. Such systems often use deep learning neural networks or comparable techniques to generate classifications of users, resulting in low explainability for potentially impactful decisions made based on user classifications. This is a significant drawback in the design of the machine learning architecture.

By contrast, the systems and methods described herein use motif embeddings as anchors to compare to user embeddings. This approach uses a user embedding that encodes the behavior sequences of the user to identify the closest motif embedding. Motif embeddings are representative archetypes corresponding to classifications of users and offer explainability not only in terms of which classification most closely resembles a user but also identify the nature of the proximity in one or more aspects of the behavior sequences. By doing so, the system allows for in-depth comparisons from users to classification archetypes, or other users, as well as providing comprehensive explanations for decisions based on user classifications.

In some aspects, methods and systems are described herein comprising generating a first set of embeddings in an embedding space by inputting, to a motif encoder model, a set of event motifs associated with a set of labels; generating a second set of embeddings for a first user by providing, to the motif encoder model, an event sequence of the first user; selecting a set of search anchor embeddings by determining a first set of distances between the second set of embeddings and the first set of embeddings; querying the embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of labels; and concurrently presenting the explanatory label and a profile title associated with the candidate profile.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in generating explainability for user classifications using motif embeddings, in accordance with one or more embodiments.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
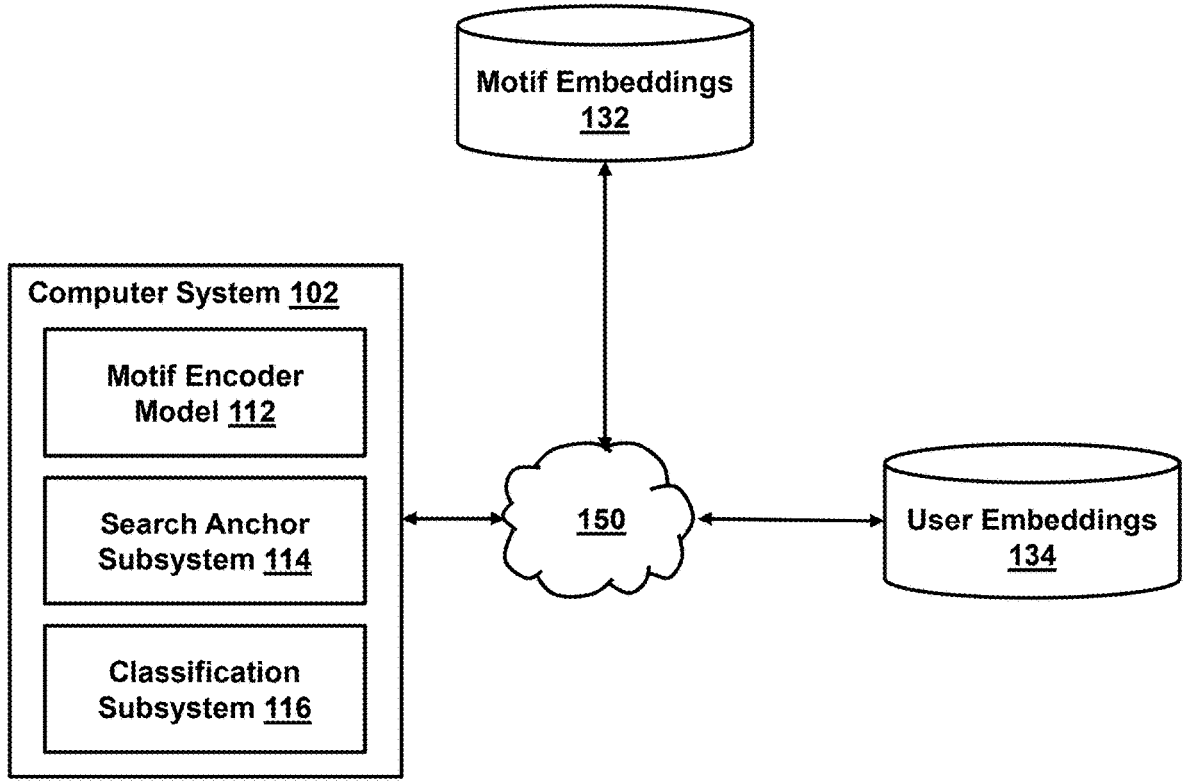
FIG. 1 shows an illustrative diagram for a system for generating explainability for user classifications using motif embeddings, in accordance with one or more embodiments.

FIG. 1 shows an illustrative diagram for system 150, which contains hardware and software components used to provide responses to search queries based on adjacent keywords and filters generated using a machine learning model, in accordance with one or more embodiments. For example, Computer System 102, a part of system 150, may include Motif Encoder Model 112, Search Anchor Subsystem 114, and Classification Subsystem 116. System 150 may create, store, or otherwise interact with Motif Embeddings 132 and User Embeddings 134.

The system may be deployed to generate a first set of embeddings (e.g., Motif Embeddings 132) in an embedding space by inputting a set of event motifs associated with a set of labels to a motif encoder model. Motif Embeddings 132 may be motif embeddings in an event sequence embedding space representing event motifs. Motif embeddings refer to the representation of motifs in a structured or unstructured data context in a multi-dimensional, real-valued space. Motifs are recurring patterns or elements, which may be detected in data due to prominence or significance in one or more areas. For example, the set of labels may correspond to explanatory behavior labels indicating a malicious behavior category. For example, malicious behavior may be correlated with unscrupulous cybersecurity practices or practices damaging the confidentiality of user data. In some embodiments, generating the first set of embeddings includes generating the explanatory label based on a first motif, and presenting the explanatory label includes presenting the first motif.

The system may use Motif Encoder Model 112 to generate Motif Embeddings 132. Initially, raw data containing motifs, which may be recurring patterns in sequences like DNA or protein sequences, undergo preprocessing to extract relevant features and convert them into numerical representations or embeddings. This may be done with a pre-trained embedding map in some embodiments. In other embodiments, the system may train Motif Encoder Model 112 to generate its own embedding map. These real-valued embeddings are then fed into the encoder algorithm, typically a neural network architecture like a convolutional neural network (CNN) or a recurrent neural network (RNN), designed to capture intricate patterns and dependencies within the motifs. The model is trained using a specific loss function tailored to the task, such as binary cross-entropy for binary classification tasks or mean squared error for regression tasks, aiming to minimize the discrepancy between predicted embeddings and ground truth embeddings. This optimization process employs backpropagation and gradient descent techniques to update the model's parameters iteratively, fine-tuning its ability to encode motifs accurately. The training continues for multiple epochs until the model converges, achieving a satisfactory level of performance in embedding motifs effectively for downstream tasks like motif discovery or sequence analysis.

The system may then generate a second set of embeddings (e.g., User Embeddings 134) for a first user by providing, to the motif encoder model, an event sequence of the first user. User Embeddings 134 may be in the same embedding space as Motif Embeddings 132, consisting of the same multi-dimensional real-valued vectors found in the embedding space. User Embeddings may correspond to one or more attributes, characteristics, or behavior patterns associated with a user. For example, an embedding in User Embeddings may indicate a propensity to engage in unsafe data practices. User Embeddings may be generated by the same motif encoder model as that which generated Motif Embeddings 132 (e.g., Motif Encoder Model 112). Motif Encoder Model 112 may process an event sequence. The event sequence may be a real-valued vector encoding one or more events associated with the user. The event sequence may be represented as numerical tokens with a standardized correspondence to real numbers. In some embodiments, the system determines an occurrence count of a candidate motif based on an event history of a first training record associated with a user label indicating malicious behavior. The system may then determine a result indicating if the occurrence count satisfies a threshold. If so, the system updates the set of event motifs to comprise the candidate motif based on the result. In some embodiments, determining the result includes detecting a second occurrence count of the candidate motif based on a set of event histories of a set of training records not associated with the user label. For example, the set of training records is associated with other labels, possibly indicating other behavior patterns than those indicated by the label. The system determines a ratio based on the first occurrence count and the second occurrence count to calculate whether the ratio satisfies the threshold. In some embodiments, the system may determine an additional occurrence count of an additional candidate motif based on the event history. The system may thus determine an additional result indicating that the additional occurrence count does not satisfy the threshold. In such embodiments, updating the set of event motifs includes updating the set of event motifs such that the set of event motifs does not comprise the additional candidate motif based on the additional result.

In some embodiments, the system may filter an event history to remove a subset of events labeled with a set of event categories. For example, the system may remove events associated with a restricted category. In some embodiments, the system may filter the event history to isolate a particular type of behavior from users. The system may then detect a candidate motif based on repeated event sequences of the filtered event history. The system then updates the set of event motifs to comprise the candidate motif. For example, the candidate motif may be a newly identified category of problematic behavior sequences from users. In some embodiments, the system may detect that a first candidate motif is present in a second candidate motif of the set of event motifs. For example, the system may skip at least one event indicated by the second candidate motif. The system may consequently remove the second candidate motif from the set of event motifs based on detecting that the first candidate motif is present in the second candidate motif. By doing so, the system may reduce redundancies in candidate motifs.

Search Anchor Subsystem 114 may select a set of search anchor embeddings by determining a first set of distances between User Embeddings and Motif Embeddings. User Embeddings and Motif Embeddings may share the same dimensions of real values, and therefore may be eligible for a direct mathematical comparison to determine distances from one another. The system may determine the first set of distances by quantifying the similarity or dissimilarity between embeddings as numerical representations of data points such as words, images, or documents in a high-dimensional space. The comparison is typically achieved using distance metrics like Euclidean distance, cosine similarity, or Manhattan distance. These metrics measure the geometric or angular separation between embeddings, providing a quantitative measure of their semantic or structural relatedness. Lower distances indicate higher similarity, while larger distances imply greater dissimilarity. By comparing distances between User Embeddings and Motif Embeddings, the system may select appropriate motif embeddings most similar to a user's behavior sequences as described by the embedding.

Search Anchor Subsystem 114 may query the embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of labels. In some embodiments, determining the second set of distances includes obtaining a demographic category associated with the candidate profile; and updating the second set of distances based on a distance penalty mapped to the demographic category. For example, the system may modify the distance between a user embedding and a motif embedding to reduce the distance along a specific dimension corresponding to the restricted demographic category.

In some embodiments, the system may determine a demographic category based on the first user in order to retrieve candidate profiles mapped to a superset of embeddings of the embedding space. The system may filter the plurality of candidate profiles to remove a second candidate profile associated with a restricted category. By doing so, the system may limit comparisons based on sensitive categories and protect user confidentiality. In these embodiments, the system may select the candidate profile for association with the first user ignoring embeddings mapped to the second candidate profile.

In some embodiments, the system may determine that a distance between the user embedding and a motif embedding. In such cases, the system may calculate a third set of distances between the set of search anchor embeddings and the candidate profile embedding. Using a ranking of the third set of distances, the system may select a second explanatory embedding associated with a second explanatory label. The system may concurrently present the second explanatory label and a second classification associated with the motif embedding. This applies to user profiles that belong to more than one explanatory label or category based on the distances of embeddings from the user embedding to a motif embedding.

Classification Subsystem 116 may generate or present the explanatory label and a profile title associated with the candidate profile. For example, the system may output a text string corresponding to the explanatory label and the profile title. In some embodiments, the system may output real values corresponding to the profile embedding that placed the user embedding into the explanatory label. The output may be used by a system or a downstream model to determine, for example, the creditworthiness of an applicant for a line of credit. The output may also be used in other instances and contexts of further processing to generate recommended actions for the user based on the explanatory label.

Figure 2:
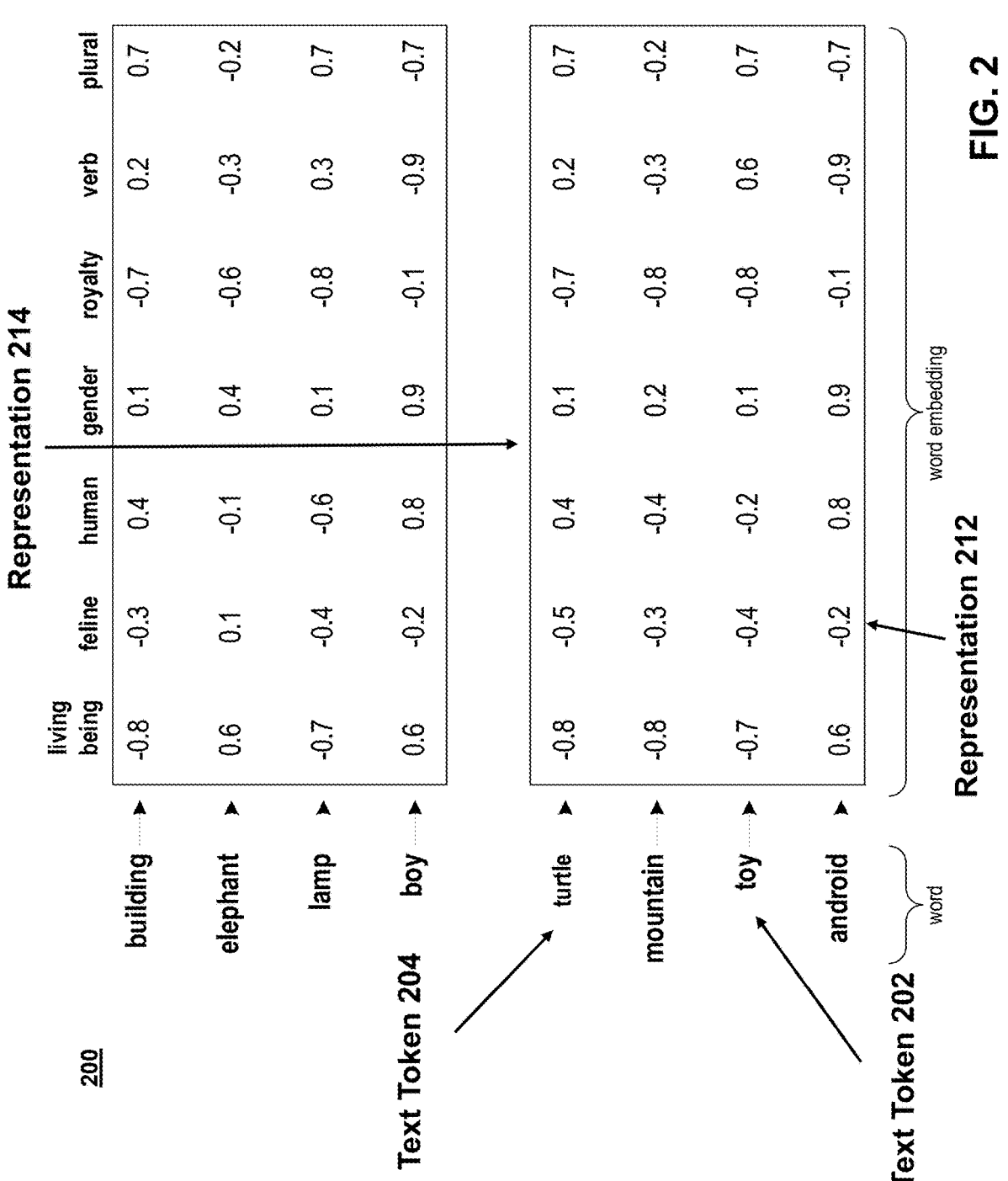
FIG. 2 shows real-valued embeddings corresponding to text tokens, in accordance with one or more embodiments.

FIG. 2 shows illustration 200 for text tokens being projected to representations in a real-valued space. These text tokens may constitute descriptions of user behavior from which motifs and sequence patterns can be extracted. For example, Text Token 202 comprises the word "toy" and Text Token 204 comprises the word "turtle". In some embodiments, some text tokens may include sentences or paragraphs instead of words. Alternatively, numbers, symbols, or punctuation may also be text tokens. Each text token may correspond to a representation. For example, Text Token 202 corresponds to Representation 212, a vector of real values: [−0.7, −0.4, −0.6, 0.1, −0.8, 0.3, 0.7]. The vector of real values is associated with a set of features, each of which correlates with an attribute which may be associated with a word. Text Token 204 may be associated with Representation 214, which is a vector of different real numbers associated with the same set of features: [−0.8, −0.3, 0.4, 0.1, −0.7, 0.2, 0.7]. For example, some features may correlate with whether a word signifies a human, what gender the word would be, or whether the word is a verb. In some embodiments, sentences, paragraphs, and symbols may be associated with a set of features different from the set used for words.

Representations in the format of Representation 212 and Representation 214 may be processed by a model such as Motif Encoder Model 112. Motif Encoder Model 112 may, for example, take an input representation of a vector of real values and use a combination of weights, biases and activations in a deep neural network to generate an output vector which is a transformation of the input representation. The output vector may be in the same format as the input representation, for example corresponding to the same set of features.

In some embodiments, representations in the format of Representation 212 and Representation 214 may be used to cluster users. For example, each user in a set of users may be associated with a sequence of activities. The sequence of activities for a user may be projected to a set of representations by, e.g., Motif Encoder Model 112. Thus, each user may correspond to a set of representations. The system may, for example, cluster the set of users to identify outliers or generate prototype representations for a prototype network model. Alternatively, the set of representations for a user may be used to assign a resource availability score to the user using a quantitative prediction model.

Figure 3:
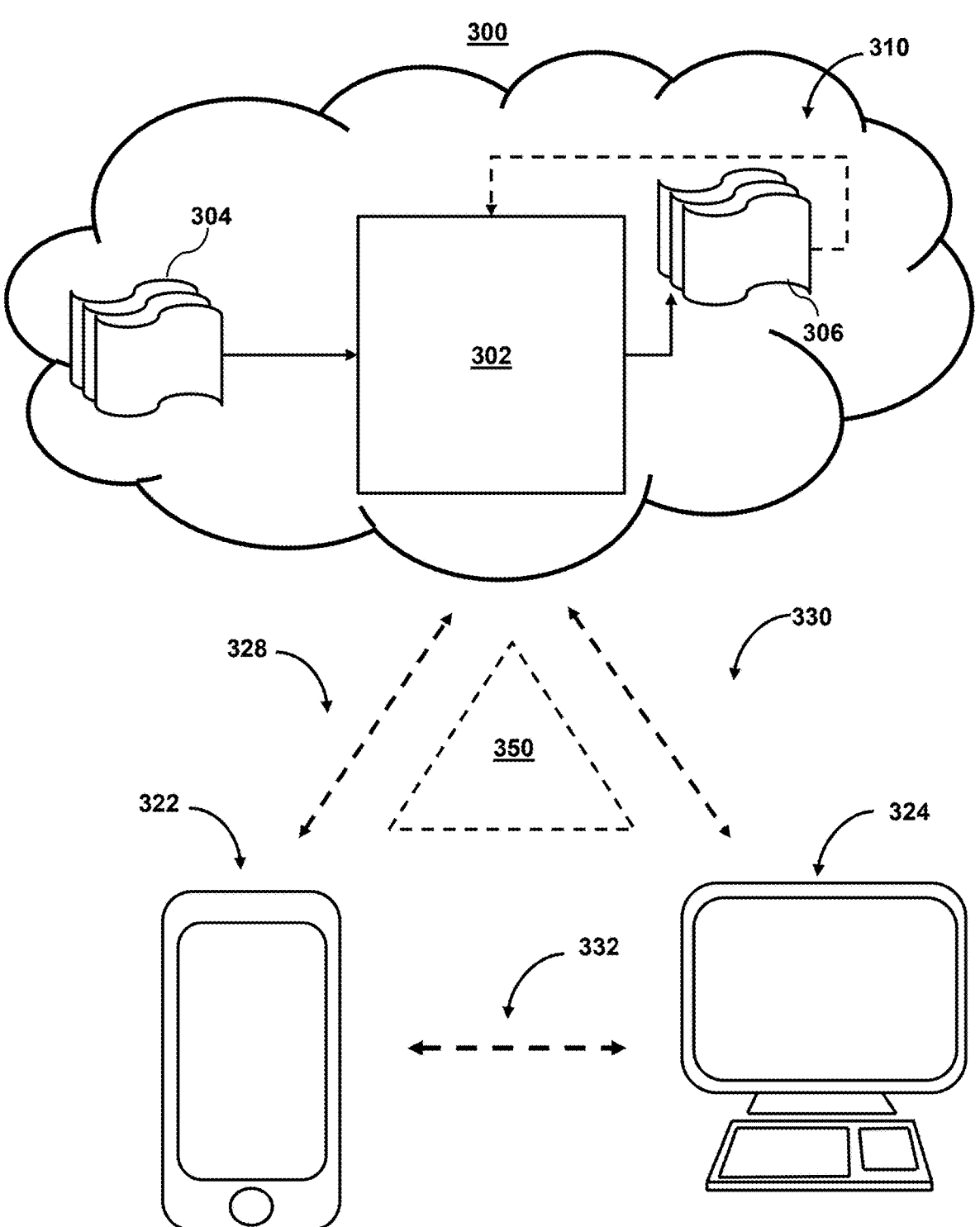
FIG. 3 shows illustrative components for generating explainability for user classifications using motif embeddings, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction. (e.g., Motif Encoder Model 112)

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output. (e.g., training Motif Encoder Model 112 to produce the embedding corresponding to an input sequence)

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where micro-services reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

FIG. 4 shows a flowchart of the steps involved in providing search query responses using adjacent keywords and search filters, in accordance with one or more embodiments. For example, the system may use process 400 (e.g., as implemented on one or more system components described above) in order to generate adjacent keywords based on embeddings of search queries, compute similarity and popularity metrics for each adjacent keyword, generate filters based on adjacent keywords, and use filters to provide responses to search queries.

At step 402, process 400 (e.g., using one or more components described above) generates a first set of embeddings (e.g., Motif Embeddings 132) in an embedding space by inputting a set of event motifs associated with a set of labels to a motif encoder model. Motif Embeddings 132 may be target motif embeddings in an event sequence embedding space representing event motifs. Motif embeddings refer to the representation of motifs in a structured or unstructured data context in a multi-dimensional, real-valued space (e.g., Representation 212, Representation 214, or another suitable representation). Motifs are recurring patterns or elements, which may be detected in data due to prominence or significance in one or more areas. For example, the set of labels may correspond to explanatory behavior labels indicating a malicious behavior category. For example, malicious behavior may be correlated with unscrupulous cyber-security practices or practices damaging to confidentiality of user data. In some embodiments, generating the first set of embeddings includes generating the explanatory label based on a first motif, and presenting the explanatory label includes presenting the first motif.

At step 404, process 400 (e.g., using one or more components described above) generates a second set of embeddings (e.g., User Embeddings 134) for a first user by providing, to the motif encoder model, an event sequence of the first user. User Embeddings may be in the same embedding space as Motif Embeddings 132, consisting of the same multi-dimensional real-valued vectors found in the embedding space (e.g., Representation 212, Representation 214, or another suitable representation). User Embeddings may correspond to one or more attributes, characteristics, or behavior patterns associated with a user. For example, an embedding in User Embeddings may indicate a propensity to engage in unsafe data practices. User Embeddings may be generated by the same motif encoder model as that which generated Motif Embeddings 132 (e.g., Motif Encoder Model 112). The model may process an event sequence. The event sequence may be a real-valued vector encoding one or more events associated with the user. The event sequence may be represented as numerical tokens with a standardized correspondence to real numbers. In some embodiments, the system determines an occurrence count of a candidate motif based on an event history of a first training record associated with a user label indicating malicious behavior. The system may then determine a result indicating if the occurrence count satisfies a threshold. If so, the system updates the set of event motifs to comprise the candidate motif based on the result. In some embodiments, determining the result includes detecting a second occurrence count of the candidate motif based on a set of event histories of a set of training records not associated with the user label. For example, the set of training records is associated with other labels, possibly indicating other behavior patterns than those indicated by the label. The system determines a ratio based on the first occurrence count and the second occurrence count to calculate whether the ratio satisfies the threshold. In some embodiments, the system may determine an additional occurrence count of an additional candidate motif based on the event history. The system may thus determine an additional result indicating that the additional occurrence count does not satisfy the threshold. In such embodiments, updating the set of event motifs includes updating the set of event motifs such that the set of event motifs does not comprise the additional candidate motif based on the additional result. In some embodiments, the system may filter an event history to remove a subset of events labeled with a set of event categories. For example, the system may remove events associated with a restricted category. In some embodiments, the system may filter the event history to isolate a particular type of behavior from users. The system may then detect a candidate motif based on repeated event sequences of the filtered event history. The system then updates the set of event motifs to comprise the candidate motif. For example, the candidate motif may be a newly identified category of problematic behavior sequences from users. In some embodiments, the system may detect that a first candidate motif is present in a second candidate motif of the set of event motifs. For example, the system may skip at least one event indicated by the second candidate motif. The system may consequently remove the second candidate motif from the set of event motifs based on detecting that the first candidate motif is present in the second candidate motif. By doing so, the system may reduce redundancies in candidate motifs.

At step 406, process 400 (e.g., using one or more components described above) selects a set of search anchor embeddings by determining a first set of distances between User Embeddings and Motif Embeddings. User Embeddings and Motif Embeddings may share the same dimensions of real values, and therefore may be eligible for a direct mathematical comparison to determine distances from one another. The system may determine the first set of distances by quantifying the similarity or dissimilarity between embeddings as numerical representations of data points such as words, images, or documents in a high-dimensional space. The comparison is typically achieved using distance metrics like Euclidean distance, cosine similarity, or Manhattan distance. These metrics measure the geometric or angular separation between embeddings, providing a quantitative measure of their semantic or structural relatedness. Lower distances indicate higher similarity, while larger distances imply greater dissimilarity. By comparing distances between User Embeddings and Motif Embeddings, the system may select appropriate motif embeddings most similar to a user's behavior sequences as described by the embedding.

At step 408, process 400 (e.g., using one or more components described above) queries the embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of labels. In some embodiments, determining the second set of distances includes obtaining a demographic category associated with the candidate profile; and updating the second set of distances based on a distance penalty mapped to the demographic category. For example, the system may modify the distance between a In some embodiments, the system may determine a demographic category based on the first user in order to retrieve candidate profiles mapped to a superset of embeddings of the embedding space. The system may filter the plurality of candidate profiles to remove a second candidate profile associated with a restricted category. By doing so, the system may limit comparisons based on sensitive categories and protect user confidentiality. In these embodiments, the system may select the candidate profile for association with the first user ignoring embeddings mapped to the second candidate profile.

In some embodiments, the system may determine that a distance between the user embedding and a second candidate profile embedding of a second candidate profile satisfies a distance threshold. In such cases, the system may calculate a third set of distances between the set of search anchor embeddings and the second candidate profile embedding. Using a ranking of the third set of distances, the system may select a second explanatory embedding associated with a second explanatory label. The system may concurrently present the second explanatory label and a second profile title associated with the second candidate profile. This applies to candidate profiles that belong to more than one explanatory label or category based on the distances of embeddings from the user embedding to a profile embedding.

At step 410, process 400 (e.g., using one or more components described above) may generate or present the explanatory label and a profile title associated with the candidate profile. For example, the system may output a text string corresponding to the explanatory label and the profile title. In some embodiments, the system may output real values corresponding to the profile embedding that placed the user embedding into the explanatory label. The output may be used by a system or a downstream model to determine, for example, the creditworthiness of an applicant for a line of credit. The output may also be used in other instances and contexts of further processing to generate recommended actions for the user based on the explanatory label.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for using event motif embeddings as search anchors to perform an explainable search for malicious activities based on a user event sequence, comprising: generating a set of target motif embeddings in an event sequence embedding space representing event motifs by inputting, to a motif encoder model, a set of event motifs associated with a set of explanatory behavior labels indicating a malicious behavior category; generating a set of user embeddings for a first user by providing, to the motif encoder model, an event sequence of the first user; selecting a set of search anchor embeddings by determining a first set of distances between the set of user embeddings and the set of target motif embeddings; querying the event sequence embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of explanatory behavior labels; and concurrently presenting the explanatory label and a profile title associated with the candidate profile.

2. A method comprising: generating a first set of embeddings in an embedding space by inputting, to a motif encoder model, a set of event motifs associated with a set of labels; generating a second set of embeddings for a first user by providing, to the motif encoder model, an event sequence of the first user; selecting a set of search anchor embeddings by determining a first set of distances between the second set of embeddings and the first set of embeddings; querying the embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of labels; and concurrently presenting the explanatory label and a profile title associated with the candidate profile.

3. A method comprising: generating a first set of embeddings in an embedding space using an encoder model based on a set of motifs; generating a second set of embeddings using the encoder model based on an event sequence; selecting a set of anchor embeddings by determining a first set of distances between the second set of embeddings and the first set of embeddings; determining a second set of distances between the set of anchor embeddings and a candidate profile embedding associated with a candidate profile; ranking the second set of distances to select a first embedding of the set of anchor embeddings, wherein the first embedding is mapped to a first label; and concurrently presenting the first label and a profile title associated with the candidate profile.

4. The method of any one of the preceding embodiments, further comprising: determining an occurrence count of a candidate motif based on an event history of a first training record associated with a user label indicating malicious behavior; determining a result indicating that the occurrence count satisfies a threshold; and updating the set of event motifs to comprise the candidate motif based on the result indicating that the occurrence count satisfies the threshold.

5. The method of any one of the preceding embodiments, wherein the candidate motif is a first candidate motif, further comprising: determining an additional occurrence count of an additional candidate motif based on the event history; determining an additional result indicating that the additional occurrence count does not satisfy the threshold, wherein updating the set of event motifs comprises updating the set of event motifs such that the set of event motifs does not comprise the additional candidate motif based on the additional result.

6. The method of any one of the preceding embodiments, wherein: generating the first set of embeddings comprises generating the explanatory label based on a first motif; and presenting the explanatory label comprises presenting the first motif.

7. The method of any one of the preceding embodiments, further comprising: filtering an event history to remove a subset of events labeled with a set of event categories; detecting a candidate motif based on repeated event sequences of the filtered event history; and updating the set of event motifs to comprise the candidate motif.

8. The method of any one of the preceding embodiments, further comprising: detecting that a first candidate motif of the set of event motifs is present in a second candidate motif of the set of event motifs by skipping at least one event indicated by the second candidate motif; and removing the second candidate motif from the set of event motifs based on a detection that the first candidate motif is present in the second candidate motif.

9. The method of any one of the preceding embodiments, wherein determining the second set of distances comprises: obtaining a demographic category associated with the candidate profile; and updating the second set of distances based on a distance penalty mapped to the demographic category.

10. The method of any one of the preceding embodiments, wherein the candidate profile is a first candidate profile, further comprising: determining a demographic category based on the first user; retrieving a plurality of candidate profiles mapped to a superset of embeddings of the embedding space; filtering the plurality of candidate profiles to remove a second candidate profile associated with a restricted category, wherein selecting the candidate profile for association with the first user comprises ignoring at least one embedding mapped to the second candidate profile.

11. The method of any one of the preceding embodiments, wherein the explanatory embedding is a first explanatory embedding, and wherein the candidate profile is a first candidate profile, and wherein the candidate profile embedding is a first candidate profile embedding, and wherein the second set of embeddings comprises a user embedding, further comprising: determining that a distance between the user embedding and a second candidate profile embedding of a second candidate profile satisfies a distance threshold; determining a third set of distances between the set of search anchor embeddings and the second candidate profile embedding; and ranking the third set of distances to select a second explanatory embedding associated with a second explanatory label; and concurrently presenting the second explanatory label and a second profile title associated with the second candidate profile.

12. The method of any one of the preceding embodiments, wherein the result is a first result, and wherein the occurrence count is a first occurrence count, and wherein determining the first result comprises: detecting a second occurrence count of the candidate motif based on a set of event histories of a set of training records not associated with the user label; determining a ratio based on the first occurrence count and the second occurrence count; and determining a second result indicating that the ratio satisfies the threshold.

13. One or more non-transitory computer-readable media storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for using event motif embeddings as search anchors to perform an explainable search for malicious activities based on a user event sequence, the system comprising one or more non-transitory, machine-readable media storing program instructions that, when executed by one or more processors, cause operations comprising:

obtaining a first occurrence count of a candidate motif and a second occurrence count of the candidate motif, the first occurrence count being based on an event history of a first training record associated with a user label indicating malicious behavior, and the second occurrence count being based on a set of event histories of a set of training records not associated with the user label;

generating a set of event motifs to comprise the candidate motif based on a result indicating a threshold being satisfied by a ratio derived from the first occurrence count and the second occurrence count;

generating a set of target motif embeddings in an event sequence embedding space representing event motifs by inputting, to a motif encoder model, the set of event motifs associated with a set of explanatory behavior labels indicating a malicious behavior category;

generating a set of user embeddings for a first user by providing, to the motif encoder model, an event sequence of the first user;

selecting a set of search anchor embeddings by determining a first set of distances between the set of user embeddings and the set of target motif embeddings;

querying the event sequence embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of explanatory behavior labels; and concurrently presenting the explanatory label and a profile title associated with the candidate profile.

2. A method comprising:

obtaining a first occurrence count of a candidate motif and a second occurrence count of the candidate motif, the first occurrence count being based on an event history of a first training record associated with a user label indicating malicious behavior, and the second occurrence count being based on a set of event histories of a set of training records not associated with the user label;

generating a set of event motifs to comprise the candidate motif based on a result indicating a threshold being satisfied by a ratio derived from the first occurrence count and the second occurrence count;

generating a first set of embeddings in an embedding space by inputting, to a motif encoder model, the set of event motifs associated with a set of labels;

generating a second set of embeddings for a first user by providing, to the motif encoder model, an event sequence of the first user;

selecting a set of search anchor embeddings by determining a first set of distances between the second set of embeddings and the first set of embeddings;

querying the embedding space to select a candidate profile for association with the first user by (i) determining a second set of distances between the set of search anchor embeddings and a set of candidate profile embeddings comprising a candidate profile embedding associated with the candidate profile and (ii) ranking the second set of distances to select an explanatory embedding of the set of search anchor embeddings, the explanatory embedding mapped to an explanatory label of the set of labels; and concurrently presenting the explanatory label and a profile title associated with the candidate profile.

3. The method of claim 2, further comprising:

determining the first occurrence count of the candidate motif based on the event history of the first training record associated with the user label indicating malicious behavior; and determining the second occurrence count of the candidate motif based on the set of event histories of the set of training records not associated with the user label, wherein generating the set of event motifs comprises updating the set of event motifs to comprise the candidate motif based on the result indicating the threshold being satisfied by the ratio.

4. The method of claim 3, wherein the candidate motif is a first candidate motif, further comprising:

determining an additional occurrence count of an additional candidate motif based on the event history;

determining an additional result indicating that the additional occurrence count does not satisfy the threshold, wherein updating the set of event motifs comprises updating the set of event motifs such that the set of event motifs does not comprise the additional candidate motif based on the additional result.

5. The method of claim 2, wherein:

generating the first set of embeddings comprises generating the explanatory label based on a first motif; and presenting the explanatory label comprises presenting the first motif.

6. The method of claim 2, further comprising:

filtering the event history to remove a subset of events labeled with a set of event categories;

detecting at least one candidate motif based on repeated event sequences of the filtered event history; and updating the set of event motifs to comprise the at least one candidate motif.

7. The method of claim 2, further comprising:

detecting that a first candidate motif of the set of event motifs is present in a second candidate motif of the set of event motifs by skipping at least one event indicated by the second candidate motif; and removing the second candidate motif from the set of event motifs based on a detection that the first candidate motif is present in the second candidate motif.

8. The method of claim 2, wherein determining the second set of distances comprises:

obtaining a demographic category associated with the candidate profile; and updating the second set of distances based on a distance penalty mapped to the demographic category.

9. The method of claim 2, wherein the candidate profile is a first candidate profile, further comprising:

determining a demographic category based on the first user;

retrieving a plurality of candidate profiles mapped to a superset of embeddings of the embedding space;

filtering the plurality of candidate profiles to remove a second candidate profile associated with a restricted category, wherein selecting the candidate profile for association with the first user comprises ignoring at least one embedding mapped to the second candidate profile.

10. The method of claim 2, wherein the explanatory embedding is a first explanatory embedding, and wherein the candidate profile is a first candidate profile, and wherein the candidate profile embedding is a first candidate profile embedding, and wherein the second set of embeddings comprises a user embedding, further comprising:

determining that a distance between the user embedding and a second candidate profile embedding of a second candidate profile satisfies a distance threshold;

determining a third set of distances between the set of search anchor embeddings and the second candidate profile embedding; and ranking the third set of distances to select a second explanatory embedding associated with a second explanatory label; and concurrently presenting the second explanatory label and a second profile title associated with the second candidate profile.

11. One or more non-transitory, machine-readable media storing program instructions that, when executed by one or more processors, cause operations comprising:

obtaining a first occurrence count of a candidate motif and a second occurrence count of the candidate motif, the first occurrence count being based on an event history of a first training record associated with a user label indicating malicious behavior, and the second occurrence count being based on a set of event histories of a set of training records not associated with the user label;

generating a set of motifs to comprise the candidate motif based on a result indicating a threshold being satisfied by a ratio derived from the first occurrence count and the second occurrence count;

generating a first set of embeddings in an embedding space using an encoder model based on the set of motifs;

generating a second set of embeddings using the encoder model based on an event sequence;

selecting a set of anchor embeddings by determining a first set of distances between the second set of embeddings and the first set of embeddings;

querying the embedding space to select a candidate profile for association with a first user by (i) determining a second set of distances between the set of anchor embeddings and a candidate profile embedding associated with the candidate profile and (ii) ranking the second set of distances to select a first embedding of the set of anchor embeddings, wherein the first embedding is mapped to a first label; and concurrently presenting the first label and a profile title associated with the candidate profile.

12. The one or more non-transitory, machine-readable media of claim 11, wherein:

the set of motifs comprises a first subset of motifs and a second subset of motifs;

the first set of embeddings comprises a first subset of motif embeddings and a second subset of motif embeddings, wherein the first subset of motif embeddings is mapped to the first subset of motifs, and wherein the second subset of motif embeddings is mapped to the second subset of motifs; and selecting the set of anchor embeddings comprises:

obtaining an indication of a first category associated with the first subset of motifs via a request; and selecting the set of anchor embeddings from the first subset of motif embeddings based on the indication of the first category.

13. The one or more non-transitory, machine-readable media of claim 11, wherein the set of motifs comprises a first motif, the first motif comprising at least three distinct event type identifiers.

14. The one or more non-transitory, machine-readable media of claim 11, wherein:

the set of motifs comprises a first subset of motifs and a second subset of motifs;

the first set of embeddings comprises a first subset of motif embeddings and a second subset of motif embeddings, wherein the first subset of motif embeddings is mapped to the first subset of motifs, and wherein the second subset of motif embeddings is mapped to the second subset of motifs; and selecting the set of anchor embeddings comprises:

selecting a first category associated with the first subset of motifs based on a category prioritization schedule; and selecting the set of anchor embeddings from the first subset of motif embeddings based on the first category.

15. The one or more non-transitory, machine-readable media of claim 11, wherein generating the set of motifs comprises updating the set of motifs to comprise the candidate motif based on the result indicating that the threshold being satisfied by the ratio.

16. The one or more non-transitory, machine-readable media of claim 11, the operations further comprising:

filtering the event history to remove a subset of events labeled with a set of restricted categories;

detecting at least one candidate motif based on repeated event sequences of the filtered event history; and updating the set of motifs to comprise the at least one candidate motif.

17. The one or more non-transitory, machine-readable media of claim 11, the operations further comprising:

detecting that a first candidate motif of the set of motifs is present in a second candidate motif of the set of motifs; and removing the second candidate motif from the set of motifs based on a detection that the first candidate motif is present in the second candidate motif.

18. The one or more non-transitory, machine-readable media of claim 11, wherein determining the second set of distances comprises:

obtaining a category associated with the candidate profile; and updating the second set of distances based on a distance penalty associated with the category.

* * * * *